US011040781B2

(12) United States Patent
Akkerman (10) Patent No.: US 11,040,781 B2
(45) Date of Patent: Jun. 22, 2021

(54) BOARDING GUIDANCE SYSTEM

(71) Applicant: Safran Seats USA LLC, Gainesville, TX (US)

(72) Inventor: Stefan Akkerman, Maarssen (NL)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 16/491,756

(22) PCT Filed: Aug. 31, 2017

(86) PCT No.: PCT/US2017/049624
§ 371 (c)(1),
(2) Date: Sep. 6, 2019

(87) PCT Pub. No.: WO2018/164710
PCT Pub. Date: Sep. 13, 2018

(65) Prior Publication Data
US 2020/0377223 A1    Dec. 3, 2020

Related U.S. Application Data

(60) Provisional application No. 62/467,504, filed on Mar. 6, 2017.

(51) Int. Cl.
*B64D 45/00* (2006.01)
*G08B 5/36* (2006.01)
*G08B 21/18* (2006.01)

(52) U.S. Cl.
CPC ............ *B64D 45/00* (2013.01); *G08B 5/36* (2013.01); *G08B 21/182* (2013.01); *B64D 2045/007* (2013.01)

(58) Field of Classification Search
None
See application file for complete search history.

(56) References Cited

U.S. PATENT DOCUMENTS 8,890,773 B1 * 11/2014 Pederson ............. H04B 10/116
345/8
10,500,981 B1 * 12/2019 Mahmoud ............ G08B 21/182
(Continued)

FOREIGN PATENT DOCUMENTS

CN      204141430 U  *  2/2015
DE    102014209554      11/2015
(Continued)

OTHER PUBLICATIONS

International Patent Application No. PCT/US2017/049624, Search Report and Written Opinion, dated Dec. 8, 2017.

*Primary Examiner* — Fekadeselassie Girma
(74) *Attorney, Agent, or Firm* — Kilpatrick Townsend & Stockton LLP (57) ABSTRACT

A boarding guidance system includes a beacon (202A) associated with a passenger seat (400A). The beacon is configured to communicate (506) with a passenger guiding device (102) and determine a distance between the passenger guiding device and the passenger seat. When the passenger guiding device is a predetermined distance from the passenger seat, the beacon provides an indication. The beacon further alter at least one characteristic of the indication based on the distance between the passenger guiding device and the passenger seat.

14 Claims, 7 Drawing Sheets

(56) References Cited

U.S. PATENT DOCUMENTS

| | | | |
|---|---|---|---|
| 2002/0172054 A1* | 11/2002 | Teng | B60Q 1/323 362/495 |
| 2010/0283593 A1* | 11/2010 | Miller | G08B 5/36 340/447 |
| 2014/0125355 A1* | 5/2014 | Grant | G01R 27/2605 324/629 |
| 2014/0242910 A1* | 8/2014 | Umlauft | H04L 63/107 455/41.1 |
| 2014/0341588 A1* | 11/2014 | Pederson | H05B 45/20 398/128 |
| 2015/0239561 A1* | 8/2015 | Hau | G06Q 10/08 715/771 |
| 2015/0239573 A1* | 8/2015 | Jouper | B64D 11/06 701/3 |
| 2015/0262436 A1* | 9/2015 | Herthan | B60R 25/2054 340/5.72 |
| 2015/0266436 A1* | 9/2015 | Erb | B63B 45/00 340/870.28 |
| 2015/0283940 A1* | 10/2015 | Salter | B60N 2/30 362/510 |
| 2016/0114890 A1* | 4/2016 | Gagnon | A62B 99/00 345/173 |
| 2016/0347453 A1* | 12/2016 | Ayyagari | B64D 45/00 |
| 2017/0072798 A1* | 3/2017 | Chen | G08G 1/0962 |
| 2017/0203856 A1* | 7/2017 | Dunn | H04R 1/28 |
| 2017/0289494 A1* | 10/2017 | Garing | G09G 3/002 |
| 2017/0372551 A1* | 12/2017 | Bruce | G06Q 10/02 |
| 2018/0216988 A1* | 8/2018 | Nance | B64C 25/001 |
| 2018/0220859 A1* | 8/2018 | Laundre | H05B 47/105 |
| 2019/0031366 A1* | 1/2019 | Lauer | H04B 5/0037 |
| 2019/0053653 A1* | 2/2019 | Hills | A47G 27/0243 |
| 2019/0177004 A1* | 6/2019 | Skelly | G06T 19/006 |
| 2019/0233113 A1* | 8/2019 | Carswell | B64D 11/003 |
| 2020/0231284 A1* | 7/2020 | Sawada | B64D 45/00 |
| 2020/0377223 A1* | 12/2020 | Akkerman | G08B 5/36 |
| 2021/0031924 A1* | 2/2021 | Dowty | B64F 5/60 |

FOREIGN PATENT DOCUMENTS

| | | | |
|---|---|---|---|
| EP | 1493662 | 1/2005 | |
| EP | 2792547 | 10/2014 | |
| JP | 2009129215 | 6/2009 | |
| WO | WO-2012039277 A1 * | 3/2012 | ....... G08B 13/19669 |
| WO | WO-2012160243 A1 * | 11/2012 | ............ G08G 1/123 |

* cited by examiner

BOARDING GUIDANCE SYSTEM

REFERENCE TO RELATED APPLICATIONS

This application claims the benefit of U.S. Provisional Application No. 62/467,504, filed Mar. 6, 2017, and entitled BOARDING GUIDANCE SYSTEM (AND SEAT WITH LUGGAGE COMPARTMENT), the content of which is hereby incorporated by reference in its entirety.

FIELD OF THE INVENTION

This application relates to boarding systems and methods for passenger vehicles, and more particularly to boarding guidance systems for passenger vehicles.

BACKGROUND

Passenger vehicles that carry a number of passengers, such as aircraft, buses, trains, ships, and automobiles, are commonly boarded by passengers at a gate, terminal, port, or other loading area. To make the boarding process more efficient, different boarding methods related to the order of getting passengers into the passenger vehicle have been proposed.

However, these boarding methods do not address the entire boarding process, which begins at a passenger's starting location at home or otherwise away from the loading area. Accordingly, these boarding methods do not address pre-boarding interactions at the gate, pre-boarding interactions at the terminal or port, the information provided to passengers, and various other interactions that may influence the boarding process. These boarding methods also do not account for various interactions that take place during boarding and on the passenger vehicle, such as seat interference (when a window or middle seat passenger boards later than the middle and/or aisle seat passenger on the same side and same row) and aisle interference (when a passenger has to wait for the passenger in front of them to take their seat and stow their luggage). Thus, there is still a need for an improved boarding system for passenger vehicles.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, a boarding guidance system includes a control hub and a beacon associated with a passenger seat. The beacon is configured to communicate with the control hub and with a passenger guiding device. The beacon is also configured to provide an indication based on a distance between the passenger guiding device and the passenger seat and alter at least one characteristic of the indication based on the distance between the passenger guiding device and the passenger seat.

In some cases, the beacon includes and indicator and a controller. The indicator is configured to provide the indication. The controller configured to: determine the distance between the passenger guiding device and the passenger seat; activate the indicator when the passenger guiding device is a predetermined distance from the passenger seat; and alter the at least one characteristic of the indication when the distance between the passenger guiding device and the passenger seat is less than the predetermined distance. In various examples, the controller is configured to deactivate the indicator when the passenger guiding device is greater than the predetermined distance from the passenger seat. In some cases, the predetermined distance is three meters. In various examples, the indicator is a light and wherein the indication is a light emission onto the passenger seat.

In various cases, the indication is a light emission, and the at least one characteristic of the indication is an intensity of the light emission. In certain examples, the beacon is configured to increase the intensity of the light emission as the distance between the passenger seat and the passenger guiding device decreases and to decrease the intensity of the light emission as the distance between the passenger seat and the passenger guiding device increases.

In some examples, the beacon is a first beacon, and the boarding guidance system further includes a second beacon. In some cases, the first beacon is configured to communicate with the passenger guiding device when the passenger guiding device is within a first communication zone that is a predetermined distance from the first beacon, and the second beacon is configured to communicate with the passenger guiding device when the passenger guiding device is within a second communication zone that is a predetermined distance from the second beacon. In various aspects, the first communication zone is outside of the second communication zone.

In certain cases, the beacon is configured to communicate with the passenger guiding device via Bluetooth.

According to certain examples, a beacon for a passenger seat includes an indicator and a controller. The indicator is configured to provide an indication on the passenger seat. The controller is configured to: determine a distance between a passenger guiding device and the passenger seat; activate the indicator when the passenger guiding device is a predetermined distance from the passenger seat; and alter the at least one characteristic of the indication when the distance between the passenger guiding device and the passenger seat is less than the predetermined distance.

In some examples, the controller is configured to deactivate the indicator when the passenger guiding device is greater than the predetermined distance from the passenger seat. In various examples, the indicator is a light, the indication is a light emission, and the at least one characteristic of the indication is an intensity of a light emission from the light. In various examples, the controller is configured to increase the intensity of the light emission as the distance between the passenger seat and the passenger guiding device decreases and to decrease the intensity of the light emission as the distance between the passenger seat and the passenger guiding device increases within the predetermined distance.

According to certain examples, a beacon system for a passenger seat includes a first beacon and a second beacon. The first beacon defines a first communication zone and is configured to communicate with a passenger guiding device when the passenger guiding device is within the first communication zone. The second beacon defines a second communication zone outside of the first communication zone and is configured to communicate with the passenger guiding device when the passenger guiding device is within the second communication zone. In some cases, the first communication zone includes a location of the passenger seat, and the first beacon is configured to provide an indication when the passenger device is within the first communication zone and alter at least one characteristic of the indication based on a distance between the passenger guiding device and the location of the passenger seat.

In various examples, the first beacon and the second beacon are configured to communicate with the passenger guiding device via Bluetooth.

In some examples, the first beacon includes an indicator configured to provide the indication and a controller. The controller is configured to: determine the distance between the passenger guiding device and the location of the passenger seat; activate the indicator when the passenger guiding device is a predetermined distance from the location of the passenger seat; and alter the at least one characteristic of the indication when the distance between the passenger guiding device and the location of the passenger seat is less than the predetermined distance.

In certain aspects, the controller is configured to deactivate the indicator when the passenger guiding device is greater than the predetermined distance from the location of the passenger seat and to deactivate the indicator when a passenger is at the location of the passenger seat. In various cases, the indicator is a light, the indication is a light emission, and the at least one characteristic of the indication is an intensity of the light emission.

According to certain examples, a boarding guidance system includes a passenger seat and a beacon associated with the passenger seat. The beacon is configured to: communicate with a passenger guiding device; provide an indication on the passenger seat when the passenger guiding device is a predetermined distance from the passenger seat; and while the passenger guiding device is within the predetermined distance from the passenger seat, alter at least one characteristic of the indication based on a distance between the passenger guiding device and the passenger seat.

In some examples, the beacon includes an indicator configured to provide the indication and a controller. The controller is configured to: determine the distance between the passenger guiding device and the passenger seat; activate the indicator when the passenger guiding device is a predetermined distance from the passenger seat; and alter the at least one characteristic of the indication when the distance between the passenger guiding device and the passenger seat is less than the predetermined distance In some aspects, the beacon is configured to communicate with the passenger guiding device via Bluetooth. In various cases, the controller is configured to deactivate the indicator when the distance from the passenger guiding device to the passenger seat is greater than the predetermined distance and deactivate the indicator when a passenger guiding device is at the location of the passenger seat. In certain examples, the indicator is a light, the indication is a light emission, and the at least one characteristic of the indication is an intensity of the light emission.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "forward," "aft," "up," "down," "top," "left," "right," "front," and "back," among others, are intended to refer to the orientation as illustrated and described in the figure (or figures) to which the components and directions are referencing.

In one aspect, disclosed is a boarding guidance system and associated methods, systems, devices, and various apparatus. The boarding guidance system may be used with a passenger vehicle, such as an aircraft, although it may be provided in various other environments where a seat for a person needs to be assigned and located by that person (e.g., at a sports stadium, at a concert venue, in a restaurant, etc.). The boarding guidance system includes a beacon system.

The beacon system includes a beacon associated with a passenger seat of the passenger vehicle, such as an aircraft passenger seat of the aircraft. The beacon is configured to provide an indication based on a distance between a passenger guiding device and the passenger seat and alter at least one characteristic of the indication based on the distance between the passenger guiding device and the passenger seat.

In another aspect, disclosed is a passenger seat, such as an aircraft passenger seat and associated methods, systems, devices, and various apparatus. The passenger seat includes seat base defining a storage compartment. In some examples, the storage compartment includes a first opening facing in an upwards direction and a second opening facing in a forward direction. In some cases, a seat pan of the seat base is a lid of the luggage compartment, and the seat pan is pivotable between a closed position and an open position to block or permit access through the first opening. In certain examples, the second opening includes a closer configured to selectively block or permit access through the second opening.

Figure 1:
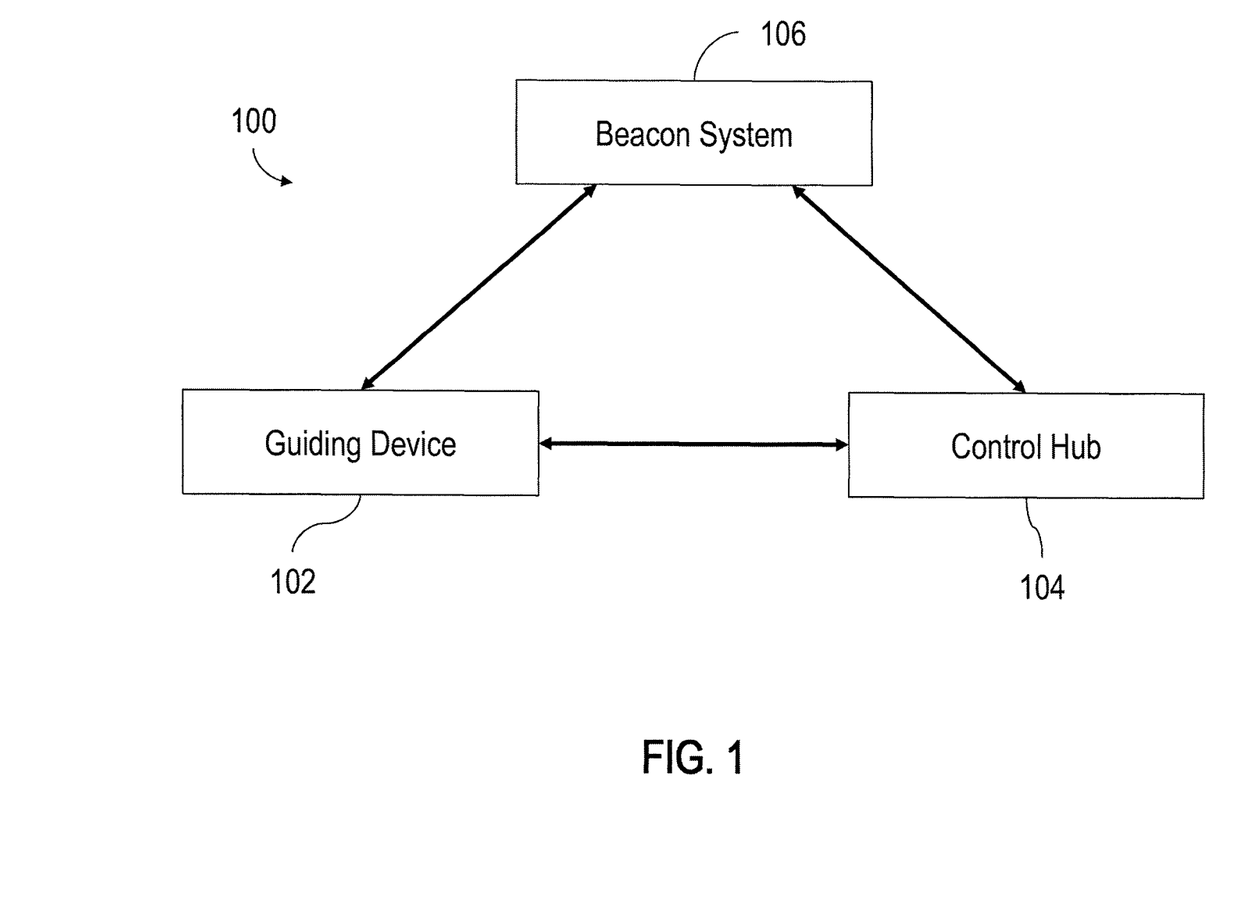
FIG. 1 is a diagram of a boarding guidance system according to aspects of the current disclosure.

Referring to FIG. 1, a boarding guidance system 100 includes a passenger guiding device 102, a control hub 104, and a beacon system 106. In various examples, the passenger guiding device 102, control hub 104, and beacon system 106 communicate with one another through wired or wireless communication (e.g., cellular communication, W-Fi, Bluetooth, etc.). In certain examples, the communication between the components of the boarding guidance system 100 need not be the same type of communication. As one non-limiting example, in some cases, the beacon system 106 and passenger guiding device 102 may communicate through Bluetooth, and the control hub 104 and beacon system 106 may communicate through cellular communication.

In some examples, the passenger guiding device 102 is a portable electronic device including, but not limited to, a cell phone, a tablet, a smart phone, a computer, a dongle, a pager, a beeper, or various other portable electronic devices. In some examples, the passenger guiding device 102 may be a personal device of a passenger. In other examples, the passenger guiding device 102 may be provided by a transportation hub (e.g., an airport) or by a passenger vehicle operator (e.g., an airline operating an aircraft). The control hub 104 includes a general purpose computer or computers, special purpose computer or computers, and/or other programmable data processing apparatus. In certain examples, the passenger guiding device 102 includes a user interface that allows a passenger to interact with an application or program controlled by the control hub 104 that at least allocates seat assignments for people in a particular environment. As one non-limiting example, the application may be a program controlled by an airline that allocates seat assignments for passengers on an aircraft.

Figure 2:
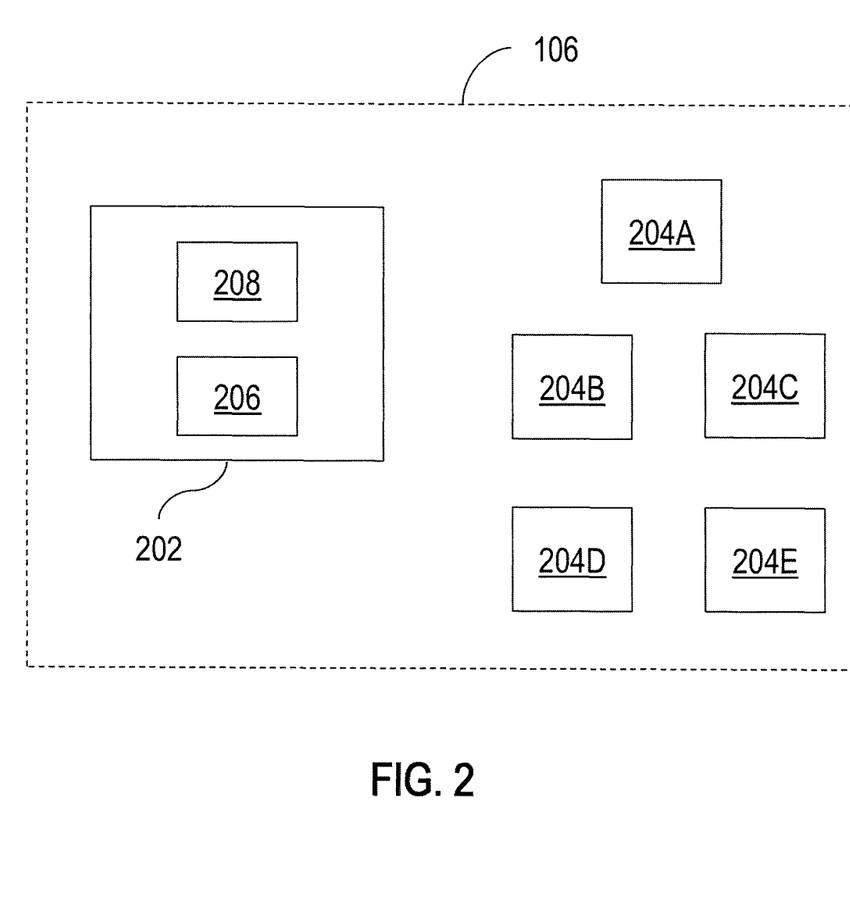
FIG. 2 is a diagram of a beacon system of the boarding guidance system of FIG. 1 according to aspects of the current disclosure.

As illustrated in FIG. 2, the beacon system 106 includes at least one final beacon 202 that is associated with a seat, such as a passenger seat of an aircraft. It will be appreciated that in passenger vehicles with a plurality of passenger seats (such as a bus, aircraft, etc.), a final beacon 202 may be provided for each passenger seat. In such examples, each final beacon 202 is configured to communicate with a particular passenger guiding device 102 (i.e., with the passenger guiding device 102 of the passenger assigned to that particular seat).

The final beacon 202 includes a controller 206 and an indicator 208. In some examples with a plurality of final beacons 202, a single controller 206 may be provided to control a plurality of indicators 208 for the plurality of final beacons 202. In other examples, each final beacon 202 includes its own controller 206. In some examples, the controller 206 and/or indicator 208 may be positioned on the particular passenger seat, although they need not be. In certain examples, the controller 206 and/or indicator 208 are positioned relative to the particular passenger seat such that the indicator 208 can provide guidance to the passenger to the associated passenger seat.

The controller 206 is configured to facilitate communication between the final beacon 202 and the passenger guiding device 102 and/or the control hub 104. In one non-limiting example, the controller 206 is configured to communicate with the passenger guiding device 102 via Bluetooth, although other communication techniques may be used. As described in detail below with reference to FIGS. 4-7, the controller 206 is configured to activate the indicator 208 when the passenger guiding device 102 is a predetermined distance from the associated seat. The controller 206 is also configured to adjust at least one characteristic of an indication provided by the indicator 208 based on a distance between the passenger guiding device 102 and the seat.

The indicator 208 may be various devices capable of providing the indication including, but not limited to, a light, a speaker, a projector, and various other types of indicators 208. The indication provided by the indicator 208 when activated may include a light emission from a light, an audible alert or message, a visual message, or various other types of indications that may be used to guide the passenger to the associated seat. In some examples, the indicator 208 provides the indication on the associated seat. As one non-limiting example, the indicator 208 is a light, such as an overhead or reading light for an aircraft passenger seat, and the indication is a light emission from the light. In various examples, at least one characteristic of the indication is adjustable. For example, depending on the type of indicator 208 and/or indication provided by the indicator 208, the at least one characteristic may be an intensity of the light emission, a pattern of light, images, or sound, a color of the light emission, a message displayed or emitted, a volume of an audible alert, a change in pitch, tone, or frequency of an audible alert, a direction of the light emission, and various other types of adjustable characteristics for the indications provided by the indicator 208.

In some optional examples, in addition to the final beacon 202, the beacon system 106 also includes guiding beacons 204A-E. The guiding beacons 204A-E may be provided at various locations between the passenger's starting location (such as at home, at a hotel, at work, etc.) and the passenger seat (such as on the aircraft). Although five guiding beacons 204A-E are illustrated, any number of guiding beacons 204 may be provided including no/zero guiding beacons 204, one guiding beacon 204, two guiding beacons 204, three guiding beacons 204, four guiding beacons 204, or more than five guiding beacons 204. In various examples, each guiding beacon 204A-E includes a controller and is configured is configured to facilitate communication with the final beacon 202, other guiding beacons 204A-E, the passenger guiding device 102, and/or the control hub 106 as desired. In one non-limiting example, each guiding beacons 204 is configured to communicate with the passenger guiding device 102 via Bluetooth, although other communication techniques may be used.

FIGS. 3-8 illustrates a non-limiting example of the boarding guidance system 100 implemented in an airport terminal 300 to facilitate boarding of an aircraft 302. A similar set-up of the boarding guidance system 100 may be used with other passenger vehicles (with or without terminals or other loading areas) or at other locations with seats.

Figure 3:
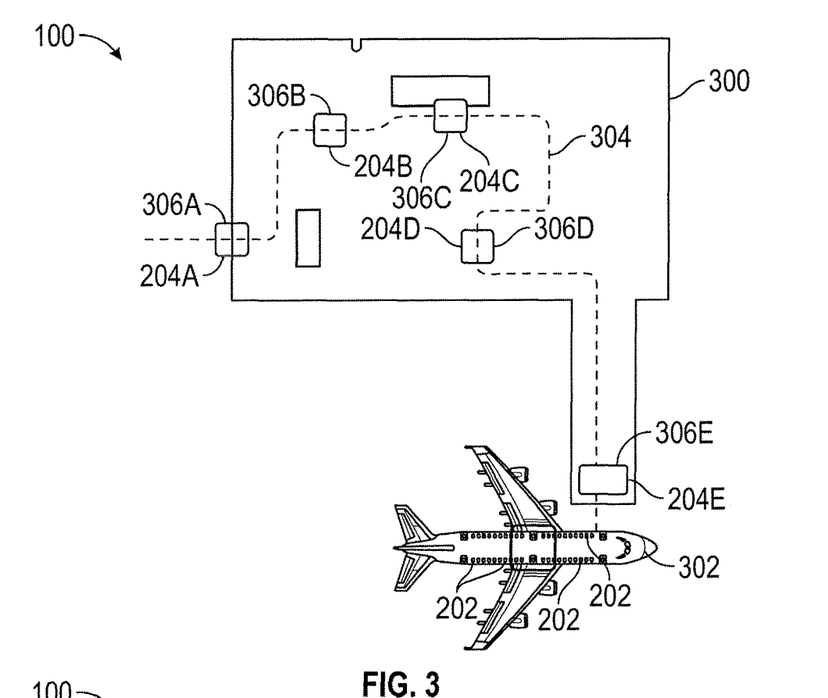
FIG. 3 is a schematic of the beacon system of FIG. 2 at a transportation hub.

Final beacons 202 of the beacon system 106 are provided on the aircraft 302 and are associated with each seat, as described in detail below. In some examples, the guiding beacons 204A-D are provided throughout the airport terminal 300. In some cases, the guiding beacons 204A-B are provided at various locations that a passenger may encounter as he or she travels along through the terminal 300. As one non-limiting example, the guiding beacon 204A may be at an entrance to the terminal 300, the guiding beacon 204B may be at a check-in counter, the guiding beacon 204C may be at a security checkpoint, the guiding beacon 204D may be in a hallway leading to a gate, and the guiding beacon 204E may be at a gate of the aircraft 302. In other examples, the guiding beacons 204A-E may be provided at various other locations.

In some optional examples, the guiding beacons 204A-E are positioned and configured to provide subtle guidance rather than direct and/or constant guidance. Subtle guidance by the guiding beacons 204A-E may provide confirmation that the passenger is travelling in the correct direction to the aircraft 302, but the passenger is free to deviate from a travel path or skip guiding beacons 204A-E. For example, as illustrated in FIG. 3, in one example, a path 304 of the passenger encounters the guiding beacons 204A-E. In other examples, the passenger may take other routes through the terminal 300 such that only some of the guiding beacons 204A-E are encountered. In further examples, the passenger may take a route such that none of the guiding beacons 204A-E are encountered.

In various examples, each guiding beacon 204A-E defines a communication zone 306A-E. Each communication zone 306A-E extends a predetermined distance from the respective guiding beacon 204A-E. When the passenger guiding device 102 (and thus the passenger) is within a communication zone 306A-E, the corresponding guiding beacon 204A-E is configured to communicate with the passenger guiding device 102. The communication may include a confirmation of the location of the passenger guiding device 102, confirmation that the passenger is travelling in the correct direction, flight status information, or various other types of information as desired. In some examples, when the passenger guiding device 102 exits a particular communication zone 306A-E, the corresponding guiding beacon 204A-E may cease communication with the passenger guiding device 102.

FIGS. 4-8 illustrate the boarding guidance system 100 within the aircraft 302. In these examples, a final beacon 204A-C is associated with each passenger seat 400A-C. In other examples, the final beacons 202 may only be provided for a particular group of seats on the aircraft 302 (e.g., only in business class on the aircraft 302, but not in economy class) or only for some seats of the aircraft 302.

In some examples, each of the final beacons 202A-C defines an indicator activation zone that extends a predetermined distance from the particular final beacon 202A-C and/or corresponding passenger seat 400A-C. As described in detail below, based on a determination by the respective controller 206 that the passenger guiding device is within or outside of the indicator activation zone, the indicator 208 may be activated or deactivated. In some examples, the predetermined distance is a distance from the particular passenger seat 400A-C to a cabin door of the aircraft 302. In such examples, the predetermined distance of one final beacon 202 at one seat 400A may be different from the predetermined distance of another final beacon 202 at another seat 400B. In other examples, the predetermined distance may be the same for each passenger seat 400A-C. For example, the predetermined distance for each passenger seat 400A-C may be less than about 20 meters, such as less than about 15 meters, such as less than about 10 meters. In other examples, the predetermined distance may be greater than about 20 meters. In one non-limiting example, the predetermined distance is less than about 5 meters, such as about 3 meters.

In various examples, the indicator activation zone may also correspond to a communication zone where, similar to the communication zones 306A-E, the final beacon 202 communicates with the passenger guiding device 102 when the passenger guiding device 102 is within the communication zone. In other examples, the final beacon 202 may communicate with the passenger guiding device 102 when the passenger guiding device 102 is outside of the indicator activation zone.

For exemplary purposes only, in FIGS. 4-8, a passenger 500 (see FIG. 5) having the passenger guiding device 102 is assigned to seat 400A by the control hub 104, and the final beacon 202A is associated with the seat 400A. In the example illustrated in FIGS. 4-7, the indicator 208A of the final beacon 202A is a light, such as the overhead or reading light for the passenger seat 400A. Through the control hub 104 (or optionally directly between the beacon system 106 and the passenger guiding device 102), the passenger seat 400A and final beacon 202A are paired with the passenger 500 having the passenger guiding device 102. In certain examples, the passenger 500 is paired with the seat 400A before entering the aircraft 302.

Figure 4:
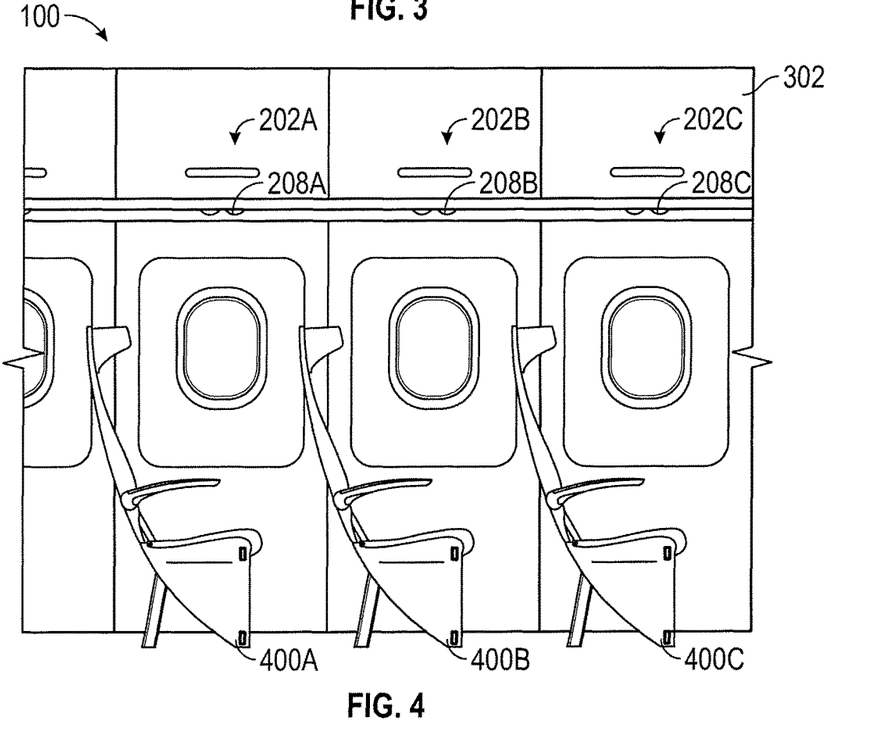
FIG. 4 illustrates an interior of a passenger vehicle with the boarding guidance system of FIG. 1.
Figure 5:
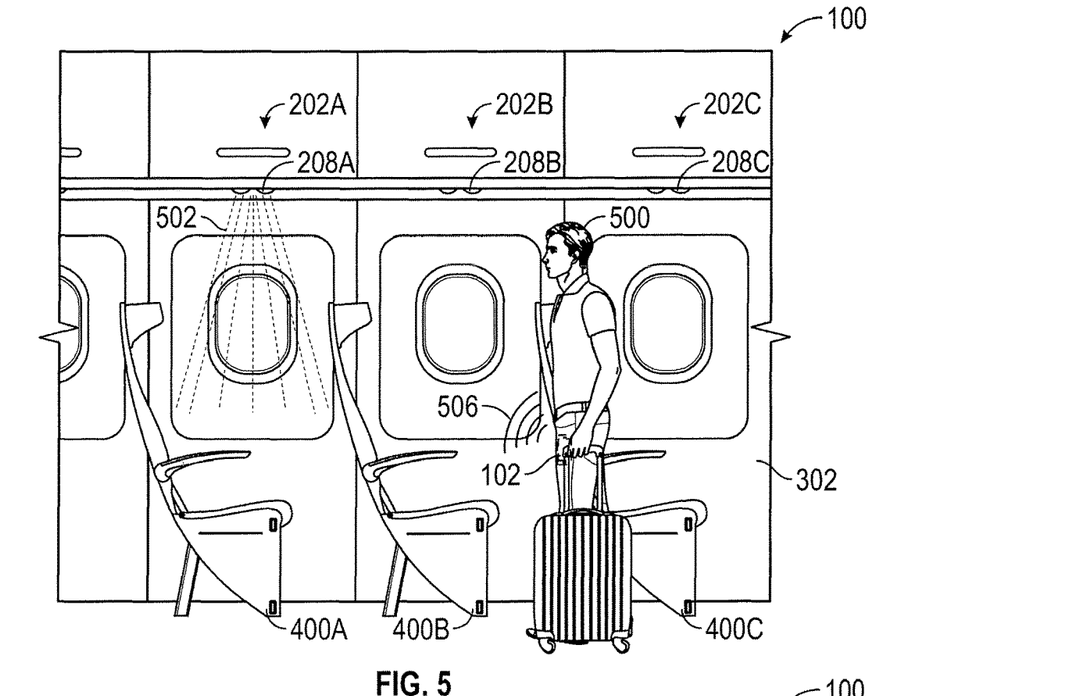
FIG. 5 illustrates the interior of the passenger vehicle of FIG. 5 with the boarding guidance system of FIG. 1 with a passenger at a first distance from a passenger seat.
Figure 8:
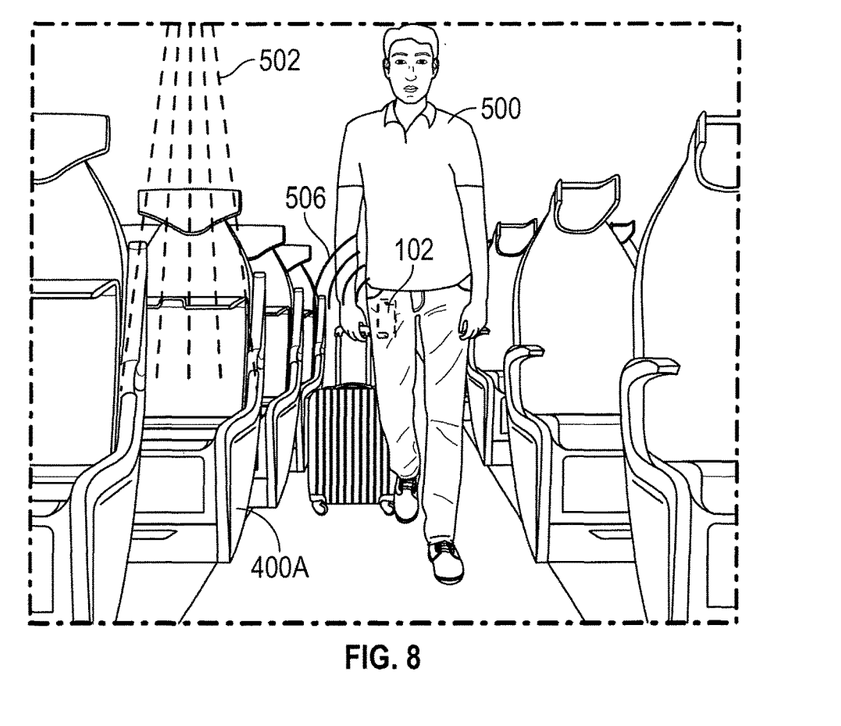
FIG. 8 illustrates the interior of the passenger vehicle of FIG. 5 with the boarding guidance system of FIG. 1.

As illustrated in FIG. 4, if the final beacon 202A determines that the passenger guiding device 102 (and thus the passenger 500) is outside of the indicator activation zone, the controller 206 of the final beacon 202A associated with the seat 400A maintains the indicator 208A of the final beacon 202A in a deactivated state (e.g., no indication is provided by the indicator 208A). As illustrated in FIGS. 5 and 8, the passenger guiding device 102 communicates with the final beacon 202A, such as via Bluetooth or other wireless communication 506. Once the final beacon 202A determines that the passenger guiding device 102 is within the indicator activation zone, the controller 206 of the final beacon 202A activates the indicator 208A such that the indicator 208A provides an indication 502 to the passenger 500. In some examples, the indication 502 is provided onto the passenger seat 400A, although it need not. In the example illustrated in FIGS. 4-8, the indication 502 is a light emission, although as described previously, in other examples, the indication 502 may be various other types of indications.

Figure 6:
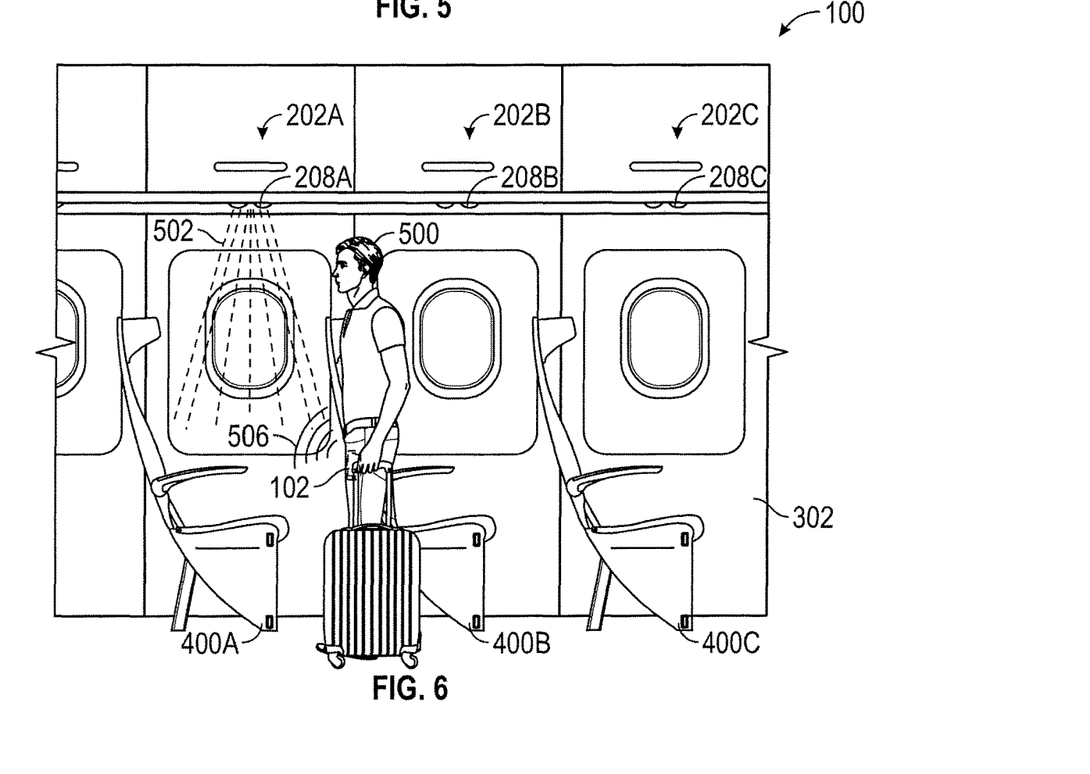
FIG. 6 illustrates the interior of the passenger vehicle of FIG. 5 with the boarding guidance system of FIG. 1 with a passenger at a second distance from a passenger seat.

While the passenger guiding device 102 is within the indicator activation zone, the final beacon 202A determines the distance between the passenger 500 and the seat 400A and/or final beacon 202A. As illustrated in FIGS. 5 and 6, based on the distance between the passenger 500 and the seat 400A, the controller 206 changes at least one characteristic of the indication 502. In the non-limiting example illustrated in FIGS. 5 and 6, the controller 206 adjusts an intensity of the light emission indication 502. For example, in some cases, the controller 206 increases the intensity of the light emission indication 502 as the distance between the passenger 500 and the seat 400A decreases (compare FIG. 6 with increased light intensity to FIG. 5 with decreased light intensity). Conversely, the controller 206 may decrease the intensity of the light emission indication 502 as the distance between the passenger 500 and the seat 400A increases. In other examples, the intensity of the light emission indication 502 may decrease as the distance between the passenger 500 and the seat 400A decreases and may increase as the distance between the passenger 500 and the seat 400A increases. As described previously, various other characteristics of the indicator 208A may be adjusted, such as the color of the light emission, pattern of the light emission, etc.

Figure 7:
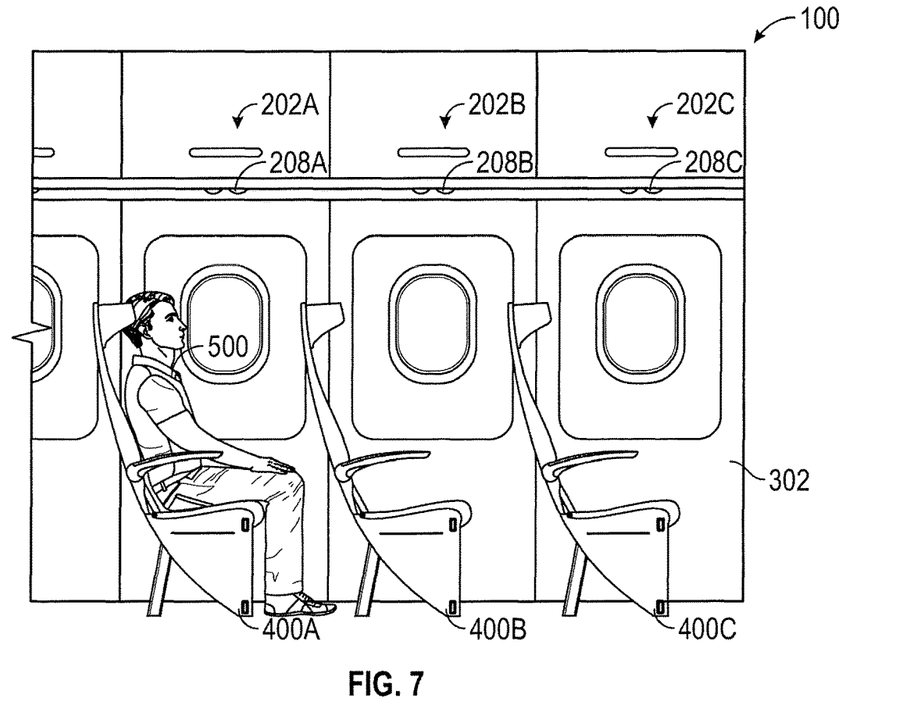
FIG. 7 illustrates the interior of the passenger vehicle of FIG. 5 with the boarding guidance system of FIG. 1 with a passenger at a third distance from a passenger seat.

As illustrated in FIG. 7, in certain examples, when the final beacon 202A determines that the passenger 500 and passenger guiding device 102 is at the final beacon 202A, the indicator 208A may be deactivated. The final beacon 202A may determine that the passenger 500 and passenger guiding device 102 are at the final beacon 202A by determining whether the locations of the passenger guiding device 102 and final beacon 202A are substantially the same. In other examples, final beacon 202A may determine that the passenger 500 and passenger guiding device 102 are at the final beacon 202A by determining whether the passenger guiding device 102 is within a deactivation zone. In various aspects, the deactivation zone may extend a predetermined distance from the final beacon 202A that is less than the predetermined distance of the indicator activation zone. In some optional examples, the indicator 208A is deactivated when the passenger 500 is seated in the seat 400A.

In various examples, a method of guiding the passenger 500 to the seat 400A with the boarding guidance system 100 includes assigning the passenger 500 to the seat 400A. Assigning the passenger 500 to the seat 400A may include pairing the passenger guiding device 102 of the passenger 500 with at least the final beacon 202A of the beacon system 106.

In certain examples, the method also includes determining by one of the guiding beacons 204A-E whether the passenger guiding device 102 is within the corresponding communication zone 306A-E, and if the passenger guiding device 102 is within the communication zone 306A-E, establishing communication between the guiding beacon 204A-E and the passenger guiding device 102. The method may also include determining by the guiding beacon that the passenger guiding device 102 is outside the communication zone 306A-E and ceasing communication between the guiding beacon 204A-E and the passenger guiding device 102.

In some examples, the method includes determining by the final beacon 202A whether the passenger guiding device 102 is within the indicator activation zone for the final beacon 202A. If the passenger guiding device 102 is within the indicator activation zone, the method includes activating the indicator 208A to provide the indication 502. In some examples, the method also includes determining by the final beacon 202A the distance between the passenger guiding device 102 and the seat 400A, and based on the determination, adjusting at least one characteristic of the indication 502. For example, in some cases, the method includes increasing an intensity of a light emission indication 502 as the distance between the passenger guiding device 102 and the seat 400A decreases and decreasing the intensity of the light emission indication 502 as the distance between the passenger guiding device 102 and the seat 400A increases. In other examples, adjusting at least one characteristic of the indication 502 includes changing a color of the indication 502 (e.g., from red to blue to green), changing a pattern (e.g., solid light emission to blinking light emission), or adjusting various other characteristics of the indication 502. In some cases, the method includes determining by the final beacon 202A whether the passenger guiding device 102 is at the seat 400A, and if so, deactivating the indicator 208A.

Referring to FIGS. 9-12, the passenger seat 400 is described in greater detail. Although the boarding guidance system 100 is illustrated with the passenger seats 400 in FIGS. 4-8, various other types of passenger seats may be used with the boarding guidance system 100.

Figure 10:
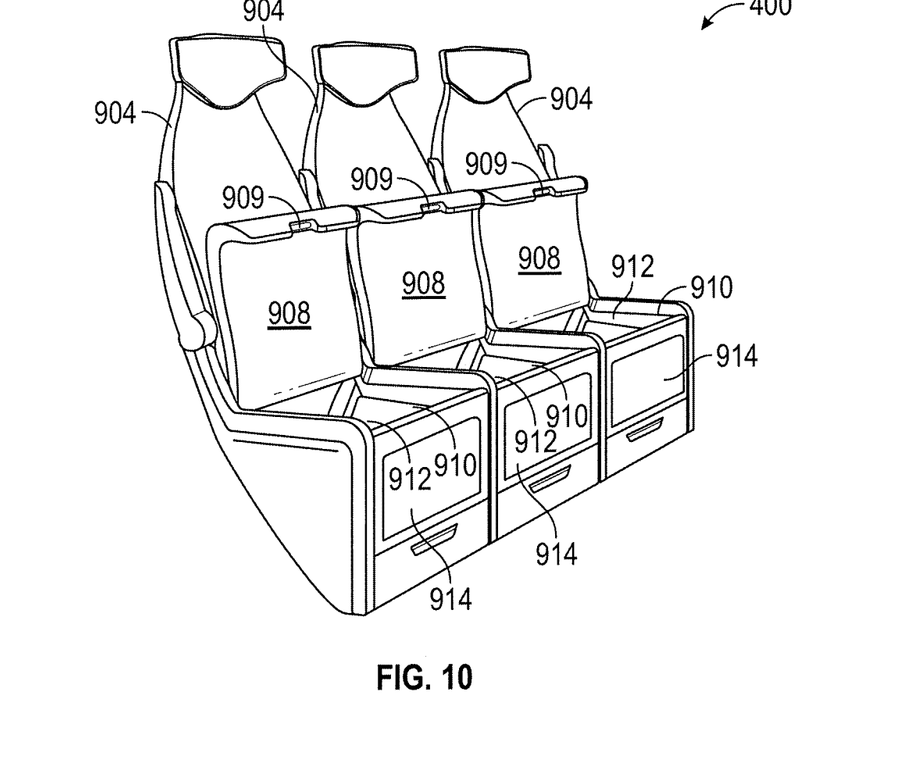
FIG. 10 is another front perspective view of the passenger seat of FIG. 9.
Figure 11:
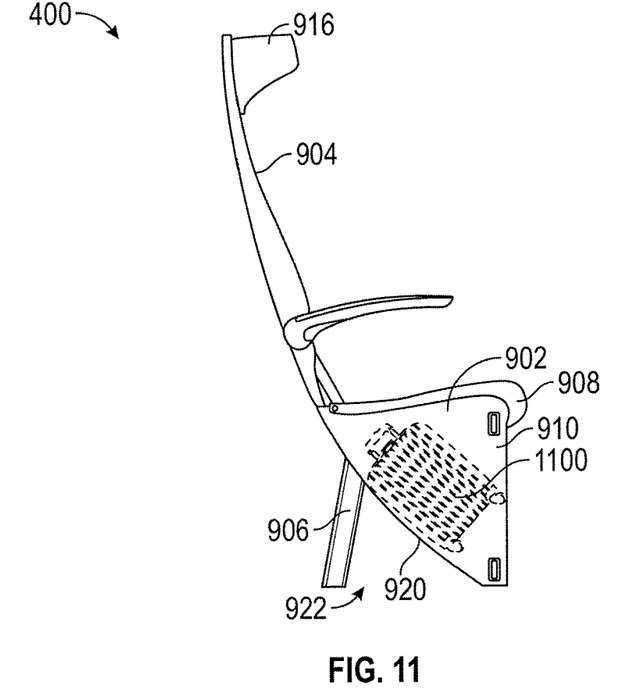
FIG. 11 is a side view of the passenger seat of FIG. 9.
Figure 12:
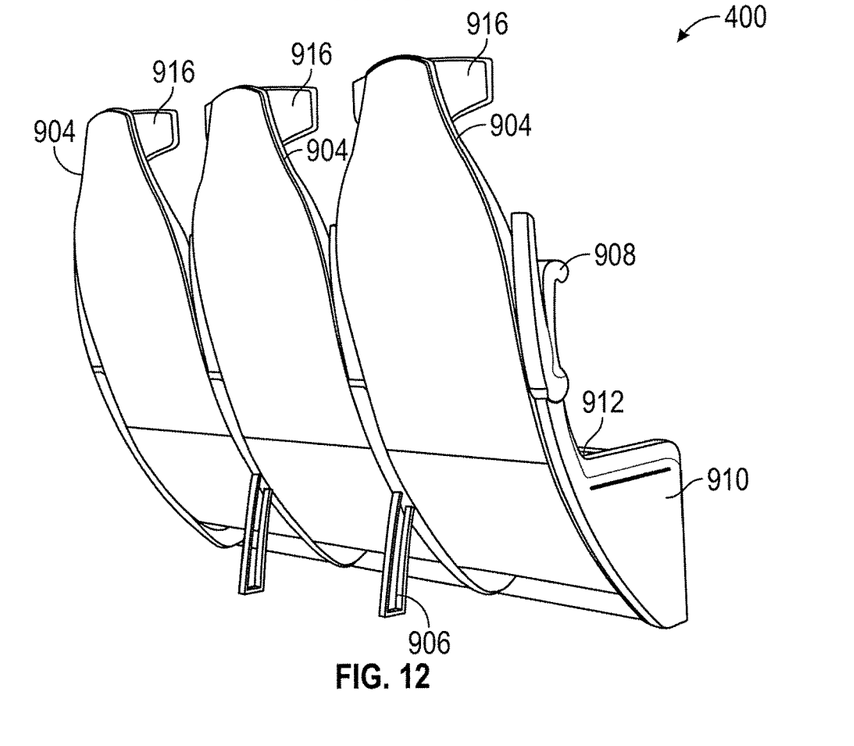
FIG. 12 is a rear perspective view of the passenger seat of FIG. 9.

As illustrated in FIGS. 9-12, the passenger seat 400 includes a base 902 and a backrest 904. In the present example, the passenger seat 400 is capable of carrying a quantity of three passengers, and accordingly has three backrests 904. However, it will be appreciated that in various other examples, the passenger seat 400 can be capable of carrying any desired number of passengers, such as one passenger, two passengers, three passengers, four passengers, or any other desired number of passengers. In these examples, the passenger seat 400 can likewise have any desired number of corresponding backrests 904. The base 902 and the backrest 904 each include various frame members 906. In some examples, as illustrated in FIG. 12, an aft side of each backrest 904 includes a screen 918 for an In-Flight Entertainment system.

The base 902 includes a seat pan 908. Similar to the backrest 904, the base 902 may include any desired number of seat pans 908. In the present example, the base 902 includes three seat pans 908. In various examples, each seat pan 908 is hingedly connected to the frame members 906 of the base 902 such that the seat pans 908 can pivot between a stowed position (see FIG. 9) and an open position (see FIG. 10). In various examples, the seat pan 908 locks in place in the stowed position, such as through a latch, hook, pin, bolt, loop, etc. In various examples, to unlock the seat pan 908 (e.g., such that the seat pan 908 may pivot to the open position), a button 909 or other unlocking mechanism may be utilized.

As illustrated in FIGS. 9-12, the base 902 includes a number of personal luggage compartments 910. In various examples, the number of personal luggage compartments 910 corresponds with the number of passengers the passenger seat 400 is capable of carrying, although it need not. The personal luggage compartments 910 are configured to store various personal belongings 1100 (see FIG. 11) including, but not limited to, backpacks, computers, purses, jackets, and other personal belongings.

Each personal luggage compartment includes a top opening 912 and a side opening. The top opening 912 generally faces upward, and may be accessed when the corresponding seat pan 908 is in the open position. In this manner, the seat pan 908 serves as a lid or cover to the top opening 912 of the personal luggage compartment 910. In some examples, the seat pan 908 is in the open position during boarding of a passenger vehicle, although it need not be.

The side opening generally faces forward and is covered by a covering flap 914. The covering flap 914 is detachably engaged with a front side 915 of the personal luggage compartment 910 such that the personal luggage compartment 910 may be accessed through the side opening. In various examples, the covering flap 914 is detachably engaged through fastening tape, hook and loop fasteners, buttons, snaps, clips, clasps, and other suitable detachable mechanisms. By providing access to the personal luggage compartment 910 through the side opening, the passenger of the passenger seat 400 is able to access the personal luggage compartment 910 while remaining seated.

As illustrated in FIG. 11, in certain examples, an aft side 920 of the personal luggage compartment 910 may optionally be arcuate shaped to provide leg space 922 for a passenger that may be seated aft of the passenger seat 400.

In other examples, the personal luggage compartment 910 may have various other shapes as desired.

Figure 9:
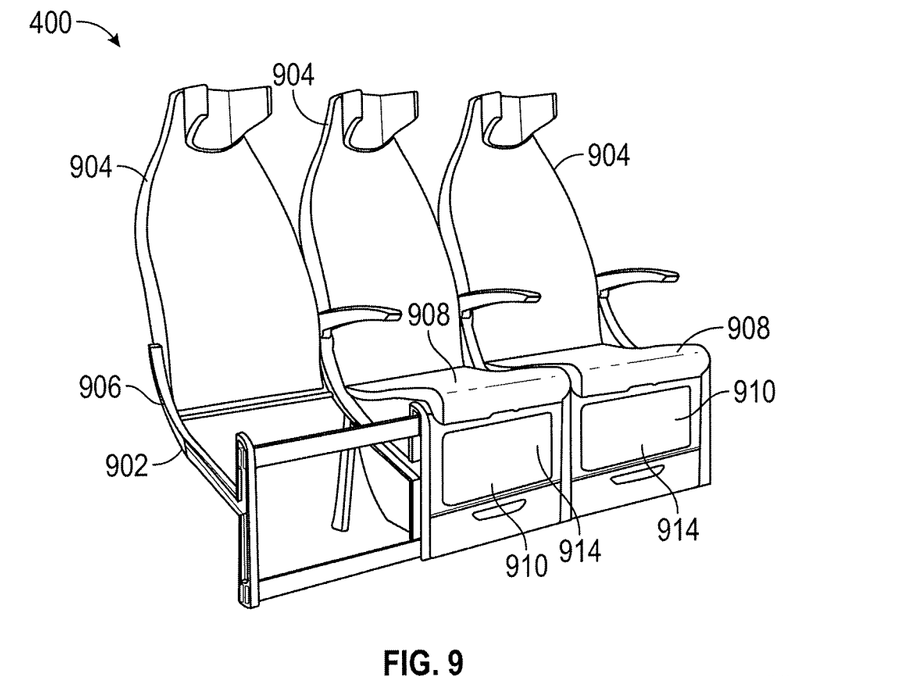
FIG. 9 is a front perspective view of a passenger seat according to aspects of the current disclosure.

As illustrated in FIGS. 9 and 10, in some examples, the passenger seat 400 also includes headrests 916 on each backrest 904. In certain examples, the headrests 916 are movable between an open position (see FIG. 10) and a seated position (see FIG. 9). In some examples, the headrests 916 are configured to move with the seat pan 908, although they need not be.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A boarding guidance system comprising: a control hub; and a beacon associated with a passenger seat, wherein the beacon is configured to: communicate with the control hub and with a passenger guiding device; provide an indication based on a distance between the passenger guiding device and the passenger seat; and alter at least one characteristic of the indication based on the distance between the passenger guiding device and the passenger seat.

EC 2. The boarding guidance system of any of the preceding or subsequent example combinations, wherein the beacon comprises: an indicator configured to provide the indication; and a controller configured to: determine the distance between the passenger guiding device and the passenger seat; activate the indicator when the passenger guiding device is a predetermined distance from the passenger seat; and alter the at least one characteristic of the indication when the distance between the passenger guiding device and the passenger seat is less than the predetermined distance.

EC 3. The boarding guidance system of any of the preceding or subsequent example combinations, wherein the controller is configured to deactivate the indicator when the passenger guiding device is greater than the predetermined distance from the passenger seat.

EC 4. The boarding guidance system of any of the preceding or subsequent example combinations, wherein the predetermined distance is three meters.

EC 5. The boarding guidance system of any of the preceding or subsequent example combinations, wherein the indicator is a light, and wherein the indication is a light emission onto the passenger seat.

EC 6. The boarding guidance system of any of the preceding or subsequent example combinations, wherein the indication is a light emission, and wherein the at least one characteristic of the indication is an intensity of the light emission.

EC 7. The boarding guidance system of any of the preceding or subsequent example combinations, wherein the beacon is configured to increase the intensity of the light emission as the distance between the passenger seat and the passenger guiding device decreases and to decrease the intensity of the light emission as the distance between the passenger seat and the passenger guiding device increases.

EC 8. The boarding guidance system of any of the preceding or subsequent example combinations, wherein the indication is a light emission, and wherein the at least one characteristic of the indication is a color of the light emission.

EC 9. The boarding guidance system of any of the preceding or subsequent example combinations, wherein the beacon is a first beacon, wherein the boarding guidance system further comprises a second beacon, wherein the first beacon is configured to communicate with the passenger guiding device when the passenger guiding device is within a first communication zone a predetermined distance from the first beacon, wherein the second beacon is configured to communicate with the passenger guiding device when the passenger guiding device is within a second communication zone a predetermined distance from the second beacon, and wherein the first communication zone is outside of the second communication zone.

EC 10. The boarding guidance system of any of the preceding or subsequent example combinations, wherein the beacon is configured to communicate with the passenger guiding device via Bluetooth.

EC 11. A beacon for a passenger seat comprising: an indicator configured to provide an indication on the passenger seat; and a controller configured to: determine a distance between a passenger guiding device and the passenger seat; activate the indicator when the passenger guiding device is a predetermined distance from the passenger seat; and alter the at least one characteristic of the indication when the distance between the passenger guiding device and the passenger seat is less than the predetermined distance.

EC 12. The beacon of any of the preceding or subsequent example combinations, wherein the controller is configured to deactivate the indicator when the passenger guiding device is greater than the predetermined distance from the passenger seat.

EC 13. The beacon of any of the preceding or subsequent example combinations, wherein the indicator is a light, wherein the indication is a light emission, and wherein the at least one characteristic of the indication is an intensity of a light emission from the light.

EC 14. The beacon of any of the preceding or subsequent example combinations, wherein the controller is configured to increase the intensity of the light emission as the distance between the passenger seat and the passenger guiding device decreases and to decrease the intensity of the light emission as the distance between the passenger seat and the passenger guiding device increases within the predetermined distance.

EC 15. A beacon system for a passenger seat comprising: a first beacon defining a first communication zone and configured to communicate with a passenger guiding device when the passenger guiding device is within the first communication zone; and a second beacon defining a second communication zone outside of the first communication zone and configured to communicate with the passenger guiding device when the passenger guiding device is within the second communication zone, wherein the first communication zone comprises a location of the passenger seat, and wherein the first beacon is configured to: provide an indication when the passenger device is within the first communication zone; and alter at least one characteristic of the indication based on a distance between the passenger guiding device and the location of the passenger seat.

EC 16. The beacon system of any of the preceding or subsequent example combinations, wherein the first beacon and the second beacon are configured to communicate with the passenger guiding device via Bluetooth.

EC 17. The beacon system of any of the preceding or subsequent example combinations, wherein the first beacon comprises: an indicator configured to provide the indication; and a controller configured to: determine the distance between the passenger guiding device and the location of the passenger seat; activate the indicator when the passenger guiding device is a predetermined distance from the location of the passenger seat; and alter the at least one characteristic of the indication when the distance between the passenger guiding device and the location of the passenger seat is less than the predetermined distance.

EC 18. The beacon system of any of the preceding or subsequent example combinations, wherein the controller is configured to deactivate the indicator when the passenger guiding device is greater than the predetermined distance from the location of the passenger seat and to deactivate the indicator when a passenger is at the location of the passenger seat.

EC 19. The beacon system of any of the preceding or subsequent example combinations, wherein the indicator is a light, wherein the indication is a light emission, and wherein the at least one characteristic of the indication is an intensity of the light emission.

EC 20. The beacon system of any of the preceding or subsequent example combinations, wherein the indication is a light emission, and wherein the at least one characteristic of the indication is an intensity of the light emission.

EC 21. A boarding guidance system comprising: a control hub; and a beacon associated with a passenger seat, wherein the beacon is configured to: communicate with the control hub and with a passenger guiding device; provide an indication when the passenger guiding device is a predetermined distance from the passenger seat; and while the passenger guiding device is within the predetermined distance from the passenger seat, alter at least one characteristic of the indication based on a distance between the passenger guiding device and the passenger seat.

EC 22. A boarding guidance system comprising: a passenger seat; and a beacon associated with the passenger seat, wherein the beacon is configured to: communicate with a passenger guiding device; provide an indication on the passenger seat when the passenger guiding device is a predetermined distance from the passenger seat; and while the passenger guiding device is within the predetermined distance from the passenger seat, alter at least one characteristic of the indication based on a distance between the passenger guiding device and the passenger seat.

EC 23. The boarding guidance system of any of the preceding or subsequent example combinations, wherein the beacon comprises: an indicator configured to provide the indication; and a controller configured to: determine the distance between the passenger guiding device and the passenger seat; activate the indicator when the passenger guiding device is a predetermined distance from the passenger seat; and alter the at least one characteristic of the indication when the distance between the passenger guiding device and the passenger seat is less than the predetermined distance EC 24. The beacon system of any of the preceding or subsequent example combinations, wherein the beacon is configured to communicate with the passenger guiding device via Bluetooth.

EC 25. The beacon system of any of the preceding or subsequent example combinations, wherein the controller is configured to: deactivate the indicator when the distance from the passenger guiding device to the passenger seat is greater than the predetermined distance; and deactivate the indicator when a passenger guiding device is at the location of the passenger seat.

EC 26. The beacon system of any of the preceding or subsequent example combinations, wherein the indicator is a light, wherein the indication is a light emission, and wherein the at least one characteristic of the indication is an intensity of the light emission.

EC 27. The beacon system of any of the preceding or subsequent example combinations, wherein the indication is a light emission, and wherein the at least one characteristic of the indication is an intensity of the light emission.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A boarding guidance system comprising:
a control hub; and
a beacon associated with a passenger seat, wherein the beacon is configured to:
communicate with the control hub and with a passenger guiding device;
provide an indication when the passenger guiding device is a predetermined distance from the passenger seat;
while the passenger guiding device is within the predetermined distance from the passenger seat, alter at least one characteristic of the indication based on a distance between the passenger guiding device and the passenger seat; and
wherein altering the at least one characteristic comprises:
gradually increase an intensity of light emission as the distance between the passenger seat and the passenger guiding device gradually decreases; and
gradually decrease the intensity of the light emission as the distance between the passenger seat and the passenger guiding device gradually increases.

2. The boarding guidance system of claim 1, wherein the beacon comprises:
an indicator configured to provide the indication; and
a controller configured to:
determine the distance between the passenger guiding device and the passenger seat;
activate the indicator when the passenger guiding device is a predetermined distance from the passenger seat; and
alter the at least one characteristic of the indication when the distance between the passenger guiding device and the passenger seat is less than the predetermined distance.

3. The boarding guidance system of claim 2, wherein the controller is configured to deactivate the indicator when the passenger guiding device is greater than the predetermined distance from the passenger seat.

4. The boarding guidance system of claim 2, wherein the predetermined distance is three meters.

5. The boarding guidance system of claim 2, wherein the indicator is a light, and wherein the indication is a light emission onto the passenger seat.

6. The boarding guidance system of claim 1, wherein the indication is a light emission, and wherein the at least one characteristic of the indication is a color of the light emission.

7. The boarding guidance system of claim 1, wherein the beacon is a first beacon, wherein the boarding guidance system further comprises a second beacon, wherein the first beacon is configured to communicate with the passenger guiding device when the passenger guiding device is within a first communication zone a predetermined distance from the first beacon, and wherein the second beacon is configured to communicate with the passenger guiding device when the passenger guiding device is within a second communication zone a predetermined distance from the second beacon, and wherein the first communication zone is outside of the second communication zone.

8. The boarding guidance system of claim 1, wherein the beacon is configured to communicate with the passenger guiding device via a wireless signal.

9. A beacon for a passenger seat comprising:
an indicator configured to provide an indication on the passenger seat; and
a controller configured to:
  determine a distance between a passenger guiding device and the passenger seat;
  activate the indicator when the passenger guiding device is a predetermined distance from the passenger seat; and
  alter the at least one characteristic of the indication when the distance between the passenger guiding device and the passenger seat is less than the predetermined distance; and
  wherein altering the at least one characteristic comprises:
    gradually increase an intensity of light emission as the distance between the passenger seat and the passenger guiding device gradually decreases; and
    gradually decrease the intensity of the light emission as the distance between the passenger seat and the passenger guiding device gradually increases.

10. The beacon of claim 9, wherein the controller is configured to deactivate the indicator when the passenger guiding device is greater than the predetermined distance from the passenger seat.

11. A boarding guidance system comprising:
a passenger seat; and
a beacon associated with the passenger seat, wherein the beacon is configured to:
  communicate with a passenger guiding device;
  provide an indication on the passenger seat when the passenger guiding device is a predetermined distance from the passenger seat; and
while the passenger guiding device is within the predetermined distance from the passenger seat, alter at least one characteristic of the indication based on a distance between the passenger guiding device and the passenger seat; and
  wherein altering the at least one characteristic comprises:
    gradually increase an intensity of light emission as the distance between the passenger seat and the passenger guiding device gradually decreases; and
    gradually decrease the intensity of the light emission as the distance between the passenger seat and the passenger guiding device gradually increases.

12. The boarding guidance system of claim 11, wherein the beacon is configured to communicate with the passenger guiding device via a wireless signal.

13. The boarding guidance system of claim 11, wherein the beacon comprises:
an indicator configured to provide the indication; and
a controller configured to:
  determine the distance between the passenger guiding device and the passenger seat;
  activate the indicator when the passenger guiding device is a predetermined distance from the passenger seat; and
  alter the at least one characteristic of the indication when the distance between the passenger guiding device and the passenger seat is less than the predetermined distance.

14. The boarding guidance system of claim 13, wherein the controller is configured to:
deactivate the indicator when the distance from the passenger guiding device to the passenger seat is greater than the predetermined distance; and
deactivate the indicator when a passenger guiding device is at the passenger seat.

* * * * *